(12) United States Patent
Pieronek et al.

(10) Patent No.: US 9,724,962 B2
(45) Date of Patent: Aug. 8, 2017

(54) WHEEL HAVING COVERING PARTS

(71) Applicant: THYSSENKRUPP STEEL EUROPE AG, Duisburg (DE)

(72) Inventors: David Pieronek, Dortmund (DE); Axel Grüneklee, Duisburg (DE); Markus Zörnack, Lake Orion, MI (US)

(73) Assignee: THYSSENKRUPP STEEL EUROPE AG, Duisburg (DE)

(*) Notice: Subject to any disclaimer, the term of this patent is extended or adjusted under 35 U.S.C. 154(b) by 0 days.

(21) Appl. No.: 14/767,847

(22) PCT Filed: Jan. 31, 2014

(86) PCT No.: PCT/EP2014/051954
§ 371 (c)(1),
(2) Date: Aug. 13, 2015

(87) PCT Pub. No.: WO2014/124823
PCT Pub. Date: Aug. 21, 2014

(65) Prior Publication Data
US 2015/0367677 A1 Dec. 24, 2015

(30) Foreign Application Priority Data
Feb. 13, 2013 (DE) .................. 10 2013 101 421

(51) Int. Cl.
*B60B 7/00* (2006.01)
*B60B 7/04* (2006.01)
(Continued)

(52) U.S. Cl.
CPC .................. *B60B 7/04* (2013.01); *B60B 1/06* (2013.01); *B60B 3/10* (2013.01); *B60B 7/065* (2013.01);
(Continued)

(58) Field of Classification Search
CPC .... B60B 7/00; B60B 7/04; B60B 7/06; B60B 7/065
(Continued)

(56) References Cited

U.S. PATENT DOCUMENTS 3,312,505 A 4/1967 Hutchins
8,579,382 B2 * 11/2013 Peschiutta ............... B60B 7/006
301/37.106

(Continued)

FOREIGN PATENT DOCUMENTS

DE 10127639 A1 12/2002
DE 10143567 A1 4/2003
(Continued)

OTHER PUBLICATIONS

German Language International Search Report for International patent application No. PCT/EP2014/051954; mailing date May 16, 2014.
(Continued)

*Primary Examiner* — Jason Bellinger
(74) *Attorney, Agent, or Firm* — thyssenkrupp North America, Inc.

(57) ABSTRACT

Disclosed herein is a wheel, in particular for vehicles, such as motor vehicles, with a rim ring having an opening defined there through, and with a main support at least partially arranged in the opening in the rim ring. The wheel, despite having a low weight, provides adequate rigidity and strength and can be produced in a simple manner, while maintaining design flexibility. The main support of the wheel has a plurality of spokes, and a plurality of covering parts for at least partially covering the spokes, wherein the main support and the covering parts support the rim ring.

12 Claims, 4 Drawing Sheets

(51) Int. Cl.
*B60B 3/10* (2006.01)
*B60B 7/06* (2006.01)
*B60B 7/18* (2006.01)
*B60B 1/06* (2006.01)
*B21D 53/26* (2006.01)
*B21D 53/32* (2006.01)
*B60B 3/04* (2006.01)

(52) U.S. Cl.
CPC .............. *B60B 7/18* (2013.01); *B21D 53/265* (2013.01); *B21D 53/32* (2013.01); *B60B 3/04* (2013.01); *B60B 2310/206* (2013.01); *B60B 2310/211* (2013.01); *B60B 2310/226* (2013.01); *B60B 2310/302* (2013.01); *B60B 2310/303* (2013.01); *B60B 2310/311* (2013.01); *B60B 2310/312* (2013.01); *B60B 2310/318* (2013.01); *B60B 2360/102* (2013.01); *B60B 2360/141* (2013.01); *B60B 2360/1458* (2013.01); *B60B 2900/111* (2013.01); *B60B 2900/112* (2013.01); *B60B 2900/116* (2013.01); *B60B 2900/311* (2013.01); *B60B 2900/351* (2013.01); *B60B 2900/572* (2013.01); *B60Y 2200/11* (2013.01)

(58) Field of Classification Search
USPC ............ 301/37.101, 37.106, 37.107, 63.103, 301/63.105, 64.101
See application file for complete search history.

(56) References Cited

U.S. PATENT DOCUMENTS

| | | |
|---|---|---|
| 2004/0227392 A1 | 11/2004 | Coleman et al. |
| 2004/0262981 A1 | 12/2004 | Fitzgerald |
| 2006/0071539 A1 | 4/2006 | Sereno |
| 2010/0181821 A1 | 7/2010 | Noriega |
| 2013/0307321 A1* | 11/2013 | Mengle ..................... B60B 7/04 301/37.107 |
| 2014/0028082 A1* | 1/2014 | Peschiutta ............... B60B 7/006 301/37.107 |

FOREIGN PATENT DOCUMENTS

| | | |
|---|---|---|
| DE | 10243567 A1 | 4/2004 |
| DE | 202009013418 U1 | 2/2011 |
| EP | 1232880 A1 | 8/2002 |
| EP | 2450198 A1 | 5/2012 |
| JP | H11115401 A | 4/1999 |
| JP | 2006116984 A | 5/2006 |

OTHER PUBLICATIONS

English translation of International Search Report for International patent application No. PCT/EP2014/051954; mailing date May 16, 2014.
German Language Written Opinion of the International Search Authority for International patent application No. PCT/EP2014/051954; mailing date May 16, 2014.
German Language International Preliminary Report on Patentability for International patent application No. PCT/EP2014/051954.
English translation of International Preliminary Report on Patentability for International patent application No. PCT/EP2014/051954.
English Abstract of JP 2006116984 A.
English Abstract of EP 1232880 A1.
English Abstract of DE 10127639 A1.
English Abstract of EP 2450198 A1.
English Abstract of DE 10143567 A1.
English Abstract of JP H11115401 A.
English Abstract of DE 10243567 A1.

* cited by examiner

WHEEL HAVING COVERING PARTS

CROSS REFERENCE TO RELATED APPLICATIONS

This application is a U.S. National Stage Entry of International Patent Application Serial Number PCT/EP2014/051954, filed Jan. 31, 2014, which claims priority to German patent application no. DE 102013101421.6 filed Feb. 13, 2013, the entire contents of both of which are incorporated herein by reference.

FIELD

The invention relates to a wheel, in particular for vehicles, such as motor vehicles, with a rim ring having an opening, and with a main support at least partially arranged in the opening in the rim ring.

BACKGROUND

Wheels of this type are already known from the prior art. For example, wheels of this type for motor vehicles and in particular the main supports of said wheels are produced from steel. The main supports are designed, for example, as flat wheel disks. It is furthermore known to provide a perforated circle in the main support, for example for better cooling or for reducing the weight. Since, however, such wheels frequently do not satisfy the customers' esthetic demands, use can be made of hub caps or wheel trim caps, for example composed of plastic, which substantially completely cover the main support and permit a flexible design. However, these measures frequently also do not satisfy the esthetic demands since the hub caps are generally recognized as such.

By contrast, what are referred to as light metal rims, in which the rim ring and the main support are forged or cast in one piece, can provide a reduction in weight and a better visual impression. However, in comparison to conventional steel rims, an increased outlay on production and outlay on costs have to be accepted therefor. In addition, the corrosion resistance of wheels of this type is frequently problematic.

In order to counter these problems, use can be made of what are referred to as steel structural wheels. The main support can be reduced here in such a manner that the main support can be configured in the spoke design. Use is also made here of plastic hub caps in order to obtain an attractive visual appearance and sufficient flexibility in terms of design. In particular, however, it is disadvantageous that, because of the reduced main support with the spoke structure, a weight of up to 25% higher in comparison to a conventional steel construction has to be accepted in order to ensure sufficient stability and strength. This stems in particular from the necessary high wall thickness of the main support. In addition, the high wall thicknesses necessitate high deformation forces during production and are restricted in terms of the shaping freedom thereof.

The prior art in DE 101 27 639 A1 furthermore discloses providing a wheel having a rim ring and a main support with a covering shell in order to avoid high wall thicknesses. The single-part covering shell here substantially has the shape of the main support and has openings for connection to the hub of the motor vehicle. Sufficient stability of the wheel is thereby ensured. However, it is desirable to obtain further weight savings.

SUMMARY

One object of the present disclosure is to specify a wheel which, despite a low weight, provides sufficient rigidity and strength and can be produced in a simple manner, while at the same time permitting a high degree of design flexibility. Accordingly, described herein is a wheel having a main support that has a plurality of spokes, and a plurality of covering parts configured to at least partially covering the plurality of spokes, wherein the main support and the covering parts support a rim ring of the wheel.

BRIEF DESCRIPTION OF THE DRAWINGS

The present disclosure is described in detail below with reference to the attached drawing figures, wherein.

DETAILED DESCRIPTION

Described herein is a wheel having a main support that has a plurality of spokes, and a plurality of covering parts for at least partially covering the spokes, wherein the main support and the covering parts support a rim ring of the wheel.

For example, the main support takes on a part, preferably a predominant part, of the force transmission, for example, to or from a wheel hub to be connected to the main support, but the covering parts here likewise take on a supporting function. The main support is connected, for example directly or indirectly, preferably releasably, to a wheel hub via a connecting region, for example by means of bolts, screws or studs. As a result, the main support and the covering parts can together form the supporting structure of the wheel.

At the same time, the modular construction of the wheel permits great diversity of design by the at least partial covering of the spokes of the main support by means of the covering parts, which are preferably formed as a single part. Owing to the fact that not only one single covering part, but a plurality of covering parts, i.e. at least two covering parts, are provided, a further reduction in the weight can be undertaken since the covering parts can be used in a locally targeted manner. It has turned out here that the provision of a plurality of local covering parts is sufficient in order to be able to provide the necessary stability of the wheel, and therefore the wall thickness of the main support can be kept low and overall weights comparable to a conventional steel wheel can be achieved. In addition, the individual covering parts can be produced in a simple manner, for example in comparison to a complex covering shell, and can be used, for example, as premanufactured parts, in particular as identical parts.

The main support can advantageously also be of identical design for different covering parts. The advantage of the modular construction of a wheel according to the invention becomes particularly significant here since various covering parts can be combined with the main support in accordance with the modular principle.

The spokes of the main support run, for example, at least partially in the radial direction. By means of the provision of spokes in the main support, the main support covers, for example, less than approximately 80%, preferably less than approximately 70%, particularly preferably less than approximately 60% of the opening in the rim ring. The fact that a plurality of spokes are provided means, for example, that at least three spokes are provided. For example, five spokes or seven spokes are provided. By means of the provision of the spokes, the main support is provided, for example, in the form of a reduced wheel disk.

The spokes of the main support are covered by means of the covering parts, for example, only on one side, i.e. on the outer side of the wheel or of the main support, which outer side, in the fitted state, faces away from the vehicle.

In order to connect the main support, for example, to a wheel hub, the main support can have a central opening. The wheel can then be placed together with the main support onto the wheel hub. The central opening is arranged, for example, concentrically with the opening of said rim ring. The main support preferably has a connecting region, for example a connecting flange, for connection, for example, to the wheel hub. For example, connecting holes, for example screw holes, are provided. The number of screw holes corresponds, for example, to the number of spokes of the main support. The screw holes can be arranged, for example, as an extension of the spokes or offset with respect to the spokes.

As a result, a wheel can be provided which, owing to the plurality of covering parts, provides sufficient rigidity and strength despite a low overall weight, and simple production capability is provided. In addition, in the case of refinements according to the invention, the wheel is distinguished by an appearance which is very substantially freely configurable. The proposed wheel is therefore advantageous in particular for producing wheels of sheet metal (steel) construction.

Alternatively or additionally, by means of the use of the covering parts, a flow-optimized design can be made possible. That is to say, the flow properties are improved by the use of the covering parts in comparison to a wheel without covering parts. For example, the flow resistance of the wheel is reduced during use by the use of the covering parts.

According to a refinement of the wheel according to the invention, the covering parts are of identical or different design. By means of identical covering parts, a furthermore simplified and cost-effective production process can be achieved. In addition, a uniform visual appearance of the wheel is achieved. The covering parts are in particular of identical design here. By contrast, the flexibility in terms of design is increased by means of different covering parts.

It is basically conceivable to provide fewer covering parts than spokes. However, according to a further exemplary embodiment of the wheel according to the invention, it is preferred if at least one covering part is provided for each spoke. This results in high or balanced stability of the wheel with a uniform visual appearance. Particularly preferably, precisely one covering part is provided for each spoke. The production of the wheel is therefore furthermore simplified and the costs are kept low. It is also conceivable to at least partially cover more than one spoke with a covering part, for example to provide a covering part for at least two spokes if there is an even number of spokes.

If, according to a further refinement of the wheel according to the invention, the covering parts are each arranged locally in the region of the spokes, sufficient stability and strength and an attractive visual appearance can already be obtained by means of the covering parts with little outlay on material and costs. In particular, the covering parts are not involved in the connection of the main support to, for example, a wheel hub. The connecting holes or the connecting region of the main support for connecting to a wheel hub is therefore preferably free from covering parts or is not covered by the latter.

It is preferably provided that the covering parts form at least partially closed profile cross sections with the main support. Particularly preferably, the covering parts form at least partially closed profile cross sections with the spokes of the main support. Great stability and strength can thereby be achieved at low wall thicknesses of the main support and/or of the covering parts. For example, the covering parts are of substantially U-shape design in the profile cross section. The spokes of the main support are, for example, of substantially rectilinear design in cross section. A substantially closed profile cross section can thus be achieved. For example, the covering parts have a front side and side tabs connected thereto. The covering parts can be designed, for example, as covering caps.

Furthermore, no limits are placed on the diversity in terms of design, and therefore the covering parts can have different shapes per wheel. For example, for n spokes, n different covering parts are also provided.

According to a further advantageous refinement of the wheel according to the invention, the covering parts are connected to the main support and/or to the rim ring, in particular in an integrally bonded, frictional and/or form-fitting manner. It is preferred here if the covering parts are at least connected to the main support. The covering parts are preferably at least partially matched to the shape of the main support, in particular to the shape of the spokes of the main support. The covering parts are preferably at least partially matched to the shape of the rim ring. An integrally bonded connection can take place, for example, by means of welding or soldering, for example, given appropriate materials.

However, alternative integrally bonded types of connection, such as, for example, adhesive bonding, are also possible. One example of an alternative frictional connection between the covering parts is beading. In principle, however, other connecting techniques can also be used. Connecting techniques, such as adhesive bonding or beading, have the advantage in particular that only low costs arise and an undesirable distortion of the components can be avoided. It is furthermore possible in particular also to select materials of the connecting partners that are not suitable for welding or soldering. A further alternative is a riveted joint which has the advantage in particular of enhancing the visual appearance of the wheel. For example, the covering parts can in particular be manufactured from stainless steel, aluminum, magnesium or a plastic.

The covering parts can also be, for example, prefilled/(pre-)painted covering parts. A connecting method alternative to welding or soldering is also appropriate for connecting said covering parts.

According to a preferred embodiment of the wheel according to the invention, the covering parts are produced from sheet metal as formed parts and/or folded parts. It has turned out that covering parts which are designed as formed parts or folded parts and are composed of sheet metal impart sufficient stability and strength to the wheel, and therefore the production is further simplified and remains cost-effective. Covering parts designed in such a manner are suitable in particular for providing covering parts which are of substantially U-shaped design in profile cross section.

The covering parts can be produced particularly efficiently if, according to a further refinement of the wheel according to the invention, the covering parts are produced by means of bending. This applies in particular to covering parts which are of substantially U-shaped design in profile cross section. For example, the covering parts can be punched or cut, for example by means of laser, from sheet metal in the form of a substantially flat blank. The blanks can then be further processed by a bending operation to form covering parts.

The main support and/or the rim ring are preferably produced from sheet metal, in particular steel sheet. Particularly economical production is made possible by the use of sheet metal or steel sheet. For example, conventional carbon-containing steels are suitable. For a particularly attractive visual appearance and good use properties, use can also be made of stainless steel for the main support and/or the rim ring. Furthermore, use can also be made of alternative materials, such as, for example, fiber-reinforced plastics or composite materials, in particular metallic, multi-layered composite materials.

The wall thickness of the main support is preferably ≤8 mm, preferably ≤6 mm. Such a reduction in the wall thickness is possible, in particular in the case of main supports produced from steel sheet, because of the supporting function of the covering parts. A significant reduction in weight in comparison to previously customary steel structural wheels can thereby be achieved. Furthermore, the production is simplified by the fact that lower forces now suffice for the shaping of the main support in comparison to previously required wall thicknesses. The main support and also the covering parts are conventionally deformed cold. Hot forming or semi-hot forming and optionally press hardening are also conceivable.

If, according to a further refinement of the wheel according to the invention, the covering parts, the rim ring and/or the main support are produced from a tailored blank and/or tailored strip, locally adapted component properties, such as, for example, different materials, qualities of material and/or material thicknesses, can be selectively provided. The different properties within a tailored blank can be produced, for example, by welding different blanks (tailored welded blanks) or by rolling (tailored rolled blank), to name just two examples of tailored products. Material can thereby be used efficiently, and therefore economical production and a low overall weight accompanied by high stability and strength are the result.

According to a refinement of the wheel according to the invention, the radially outer region of the main support ends with the spokes. The main support has, for example, a substantially star-shaped structure. Connection of the main support to the rim ring can then take place in the radially outer region of the spokes, for example by means of welding or soldering.

According to a further refinement, the radially outer region of the main support can have an encircling ring. The radially outer ends of the spokes are therefore connected by the encircling ring. Additional stability and strength can be conferred on the main support by means of the encircling ring. In this case, the connection of the main support and the rim ring can advantageously take place via the encircling ring. Recesses which are preferably delimited by the spokes and the encircling ring are therefore produced in the main support.

The main support and the rim ring can be connected to each other in the region of the drop base and/or in the region of the shoulder of the rim ring. A connection of the main support in the region of the shoulder of the rim ring (also called semi-full-face concept) can, for example, provide more space on the inner side of the main support, for example for a braking device. By contrast, a connection located further on the inside in the region of the drop base may be necessary for a correspondingly desirable appearance.

Various embodiments of the present disclosure are discussed in further detail below with reference to the attached drawing figures.

Figure 1A:
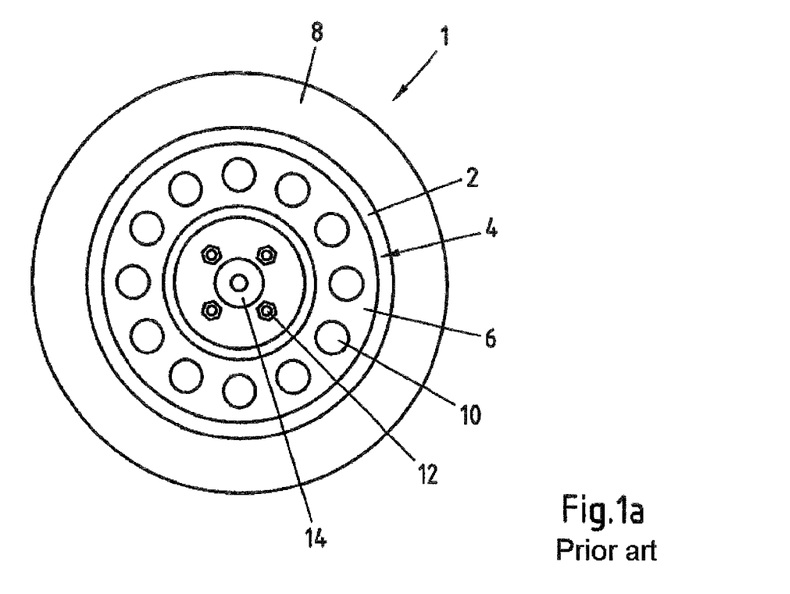
FIGS. 1a and 1b are side views of various embodiments of wheels from the prior art.

FIG. 1a shows a conventional wheel, which is designed as a steel wheel 1, of a motor vehicle (not illustrated) from the prior art. The wheel 1 has a rim ring 2 and a main support, which is inserted in the opening 4, in the form of a virtually completely closed wheel disk 6. A tire 8 is pulled onto the outer circumferential surface of the rim ring 2. The wheel disk 6 has an individual perforated ring having round holes 10. The wheel disk 6 is fastened to the wheel hub 14 located therebehind, or brake, by five studs 12. Flexibility in terms of design can only be achieved by means of a substantially completely closed plastic hub cap (not illustrated). Such a conventional steel wheel 1 has, for example, a weight of approximately 8 kg (16 inch variant).

Figure 1B:
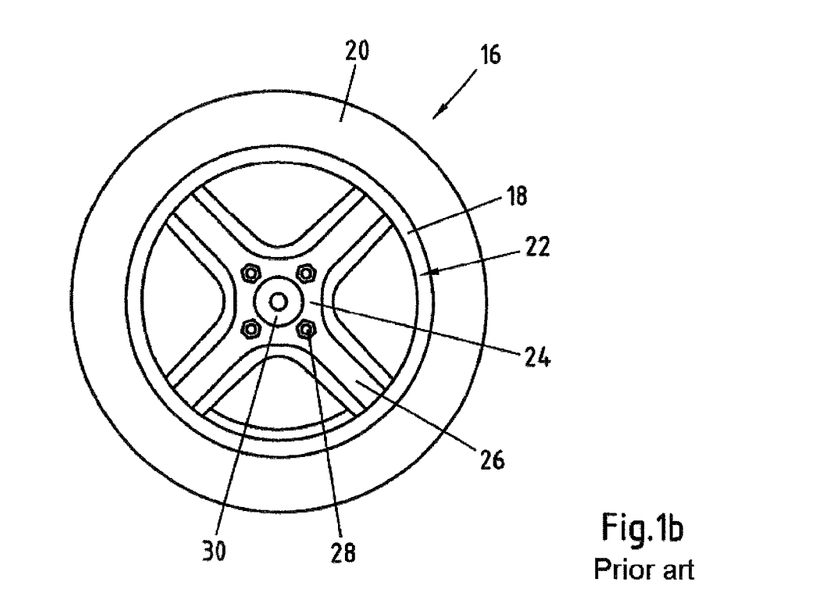

FIG. 1b shows a further wheel, which is designed as a steel structural wheel 16, from the prior art, which wheel, in addition to a rim ring 18 and a tire 20, has a main support 24, which is inserted into the opening 22, with spokes 26. The main support 24 is likewise fastened to the wheel hub 30 by means of studs 28. Like the wheel disk 6 shown in FIG. 1a, the main support 24 of such a structural wheel 16 can likewise be manufactured by means of conventional methods. A flexible configuration of the external appearance of the wheel 16 can be achieved, for example, by means of plastic caps (not illustrated). However, for sufficient stability and strength, it is necessary for a correspondingly greater wall thickness of the main support 24 to be provided. As a result, the overall weight is increased by 25% to approximately 10 kg. Correspondingly higher forces are required in the manufacturing of the main support 24.

Figure 2A:
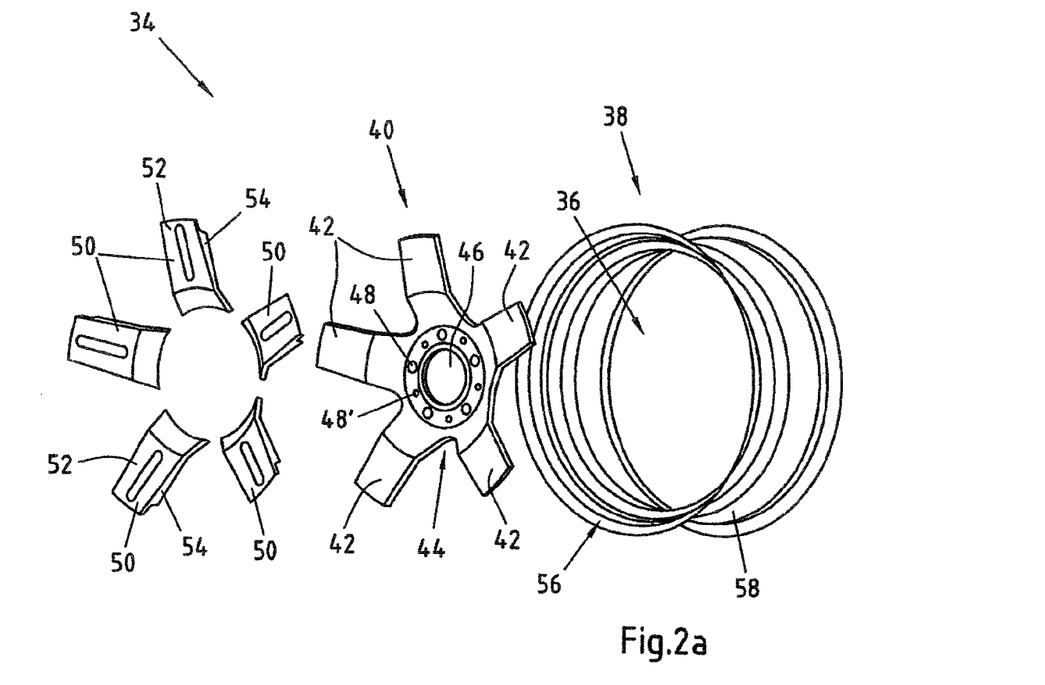
FIG. 2a is an isometric exploded view of an embodiment of a wheel of the present disclosure.
Figure 2B:
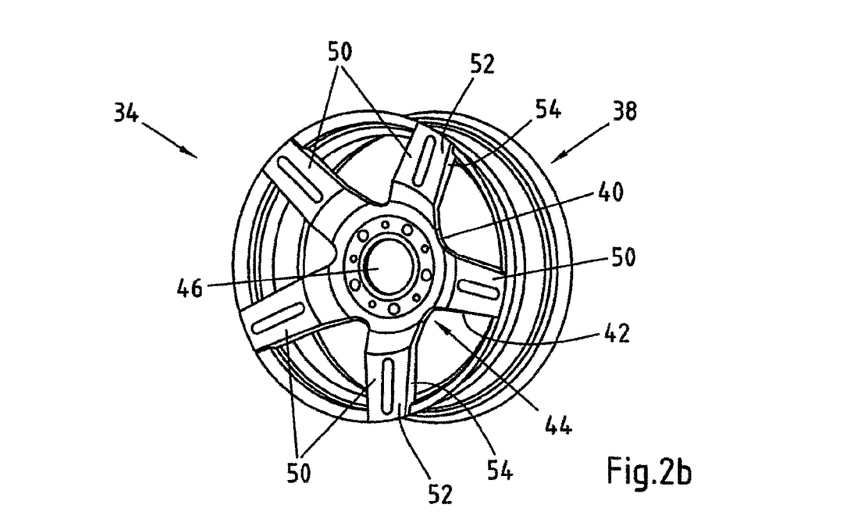
FIG. 2b is an isometric view of the wheel of FIG. 2a, in an assembled state.

FIG. 2a and FIG. 2b now show a first exemplary embodiment of a wheel 34 according to the invention before and after assembly. The wheel 34 comprises a rim ring 38 having an opening 36 and a main support 40, which is arrangeable or is arranged in the opening 36, with spokes 42. Both the rim ring and the main support are manufactured from steel sheet in this case. The rim ring 38 can also be produced, for example, from a fiber-reinforced plastic or composite material. Five spokes 42 which are of identical design and run substantially radially are provided in this exemplary embodiment of the wheel 34 and of the main support 40. In principle, however, a different number of spokes 42 can also be provided. The main support has a substantially star-shaped structure and the radially outer end thereof ends with the spokes 42.

By means of the connecting region which is provided on the main support 40 and is in the form of a connecting flange 44, said connecting flange can be connected to a hub, such as, for example, the hub 14 or 30, or to a brake. For this purpose, the substantially annular-disk-shaped connecting flange 44 has a central opening 46 which lies concentrically in the opening 36 in the rim ring 38. The connecting flange 44 has a plurality of connecting holes 48 which are arranged in a circular manner around the central opening 46. The connecting holes 48 serve as screw holes, for example for studs, and are arranged as an extension of the spokes 42. The smaller lead-throughs 48' can serve, for example, as positioning holes. The spokes 42 adjoining the connecting flange 44 extend forward here out of the plane of the connecting flange 44.

Furthermore, the wheel 34 has a number of covering parts 50 corresponding to the number of spokes 42; i.e., in this exemplary embodiment, a covering part 50 is provided for each spoke 42, that is five covering parts 50 in this case. However, covering parts 50 can also merely be provided for some of the spokes 42. In this exemplary embodiment of the wheel 34, the covering parts 50 are of identical design. In principle, however, a different configuration of the covering parts 50 is also possible. The covering parts 50 are designed in such a manner that they can be arranged locally in the region of the spokes 42 of the main support 40.

As can be seen in particular in FIG. 2, the covering parts 50 are not involved in the connection of the main support 40 to, for example, a wheel hub. In this case, not only is the region of the screw holes 48, but also the entire connecting flange 44 of the main support 40 free from the covering parts 50 or not covered by the latter. The covering parts 50 are exclusively located in the region of the spokes 42 in this case. However, the covering parts 50 nevertheless participate in the supporting function of the main support 40. To be precise, the main support takes on part, preferably a predominant part, of the force transmission between rim ring 38 and a wheel hub to be connected to the main support 40.

However, the covering parts likewise take on a supporting function here, and therefore, as a result, the main support 40 and the covering parts 50 together form the supporting structure of the wheel. For this reason, the sheet metal thickness of the main support 40 can be designed to be thinner, and therefore a weight reduction can be achieved in comparison to steel structural wheels from the prior art, such as, for example, the steel structural wheel 16, and an overall weight of conventional steel wheels, such as, for example, steel wheel 1.

The covering parts 50 are likewise produced here from steel sheet and are connected both to the main support 40 and to the rim ring 38. By manufacturing the covering parts 50 from steel sheet, the covering parts 50 can be connected, for example by means of welding or soldering, to the main support 40 and/or to the rim ring 38 if said components are produced from appropriate materials. However, it is also conceivable in principle to produce the covering parts 50, for example, from stainless steel, aluminum, magnesium or a plastic. The covering parts 50 can also be (pre-)painted.

The covering parts 50 are substantially designed as a U-shaped profile. For this purpose, the covering parts 50 have a front side 52 and two side tabs 54 arranged laterally on said front side 52. The front side 52 has an additional profiling. The side tabs 54 are folded away rearward transversely with respect to the front side 52. Together with the spokes 42 of the main support 40, the covering parts 50 therefore in each case at least partially form a substantially closed profile cross section. A high level of rigidity and therefore stability of the system of main support 40 and covering parts 50 is thereby obtained, the system having the supporting function. In the present case, the side tabs 54 of the covering parts 50 are produced as folded parts by means of bending operations, and therefore particularly efficient production can take place. In principle, however, other or further forming operations, such as, for example, punching or deep drawing, can be used in the production of the covering parts 50.

That region of the covering parts 50 which is adjacent to the rim ring 38 is matched here to the profile of the rim ring 38, and therefore the covering parts 50 end flush with the rim ring 38. The profile of the rim ring 38 is produced here in particular by an encircling shoulder region 56 and an encircling drop base 58. The main support 40 is connected here in the region of the shoulder 56 to the rim ring 38. However, it is also conceivable in principle to connect the main support 40 to the rim ring 38 in the region of the drop base 58.

Figure 3:
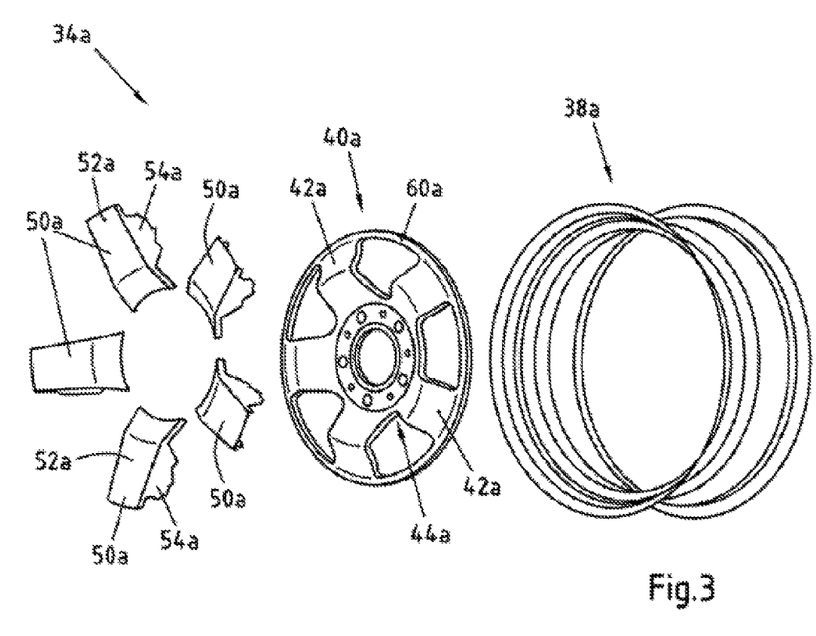
FIG. 3 is an isometric exploded view of an alternate embodiment of a wheel of the present disclosure.

FIG. 3 shows a second exemplary embodiment of a wheel 34a according to the invention. The wheel 34a is designed in a similar manner to the wheel 34 illustrated in FIG. 2a and FIG. 2b. Therefore, only the differences are discussed below and reference is otherwise made to the description of the wheel 34.

In contrast to the main support 40 of the wheel 34, the main support 40a of the wheel 34a is formed by means of an encircling ring 60a on the radially outer region thereof, as a result of which additional stability of the main support 40a can be achieved. The spokes 42a adjoining the connecting flange 44a also at least partially extend forward here out of the plane of the connecting flange 44a. The covering parts 50a are matched in turn to the shape of the spokes 42a and the profile of the rim ring 38a. In particular, the edges of the side tabs 54a of the covering parts 50a are matched to the shape of the spokes 42a and the profile of the rim ring 38a.

FIGS. 4a to 4f show further exemplary embodiments of wheels 34b to 34g according to the invention.

Figure 4A:
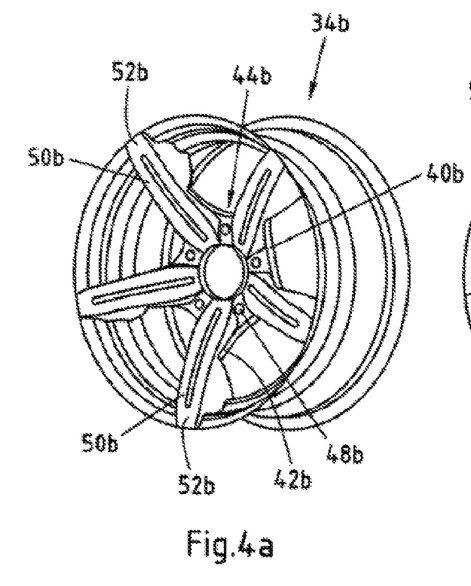
FIGS. 4a-4f are isometric views of various alternate embodiments of wheels of the present disclosure, each in an assembled state.

The exemplary embodiment of the wheel 34b shown in FIG. 4a has, for example, covering parts 50b, the front sides 52b of which partially overlap the connecting flange 44b. However, the screw holes 48b continue to be free and the covering parts 50b are not involved in the connection between main support 40b and wheel hub. In this case, the screw holes 48b are arranged offset with respect to the spokes 42b.

Figure 4B:
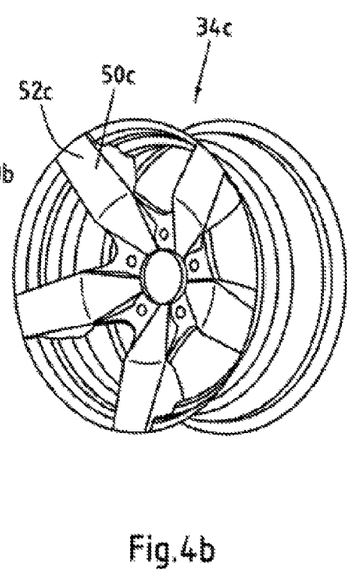

By contrast, the exemplary embodiment of a wheel 34c shown in FIG. 4b has, for example, covering parts 50c with slightly concavely curved front sides 52c. The front sides 52c of the covering parts 50c slightly converge at the radially inner end thereof.

Figure 4C:
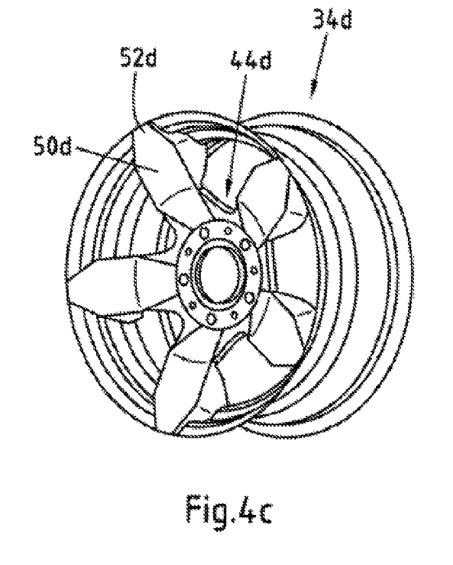

FIG. 4c shows covering parts 50d with a diamond-shaped front side 52d. By contrast, the covering parts 50d are designed in such a manner that the connecting flange 44d remains free.

Figure 4D:
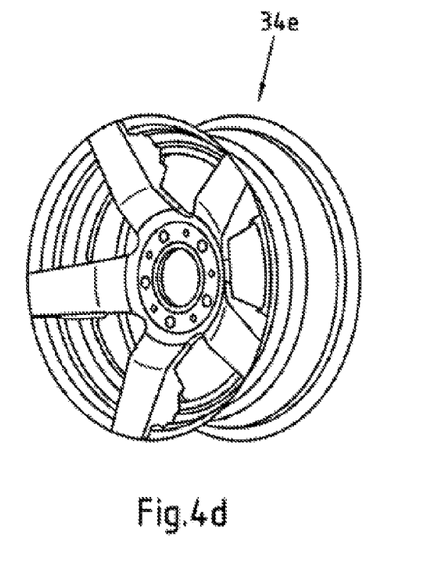

FIG. 4d shows an exemplary embodiment of a wheel 34e which can be produced, for example, from the components shown in FIG. 3.

Figure 4E:
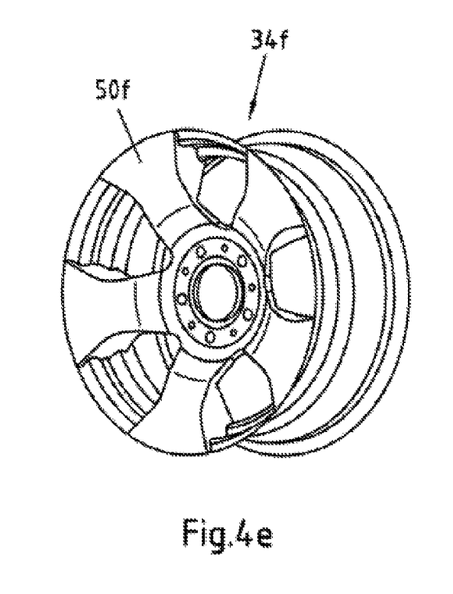

FIG. 4e shows a wheel 34f similar to the wheel 34e, but wherein the covering parts 50f are widened at the radially outer ends thereof.

Figure 4F:
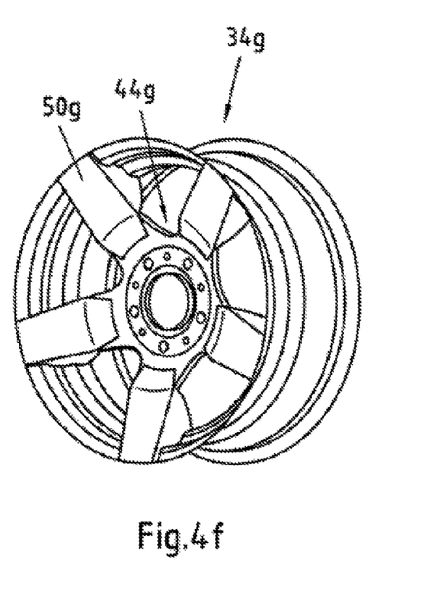

The covering parts 50g shown in FIG. 4f are similar to those shown in FIG. 4b. However, the covering parts 50g are designed in such a manner that the connecting flange 44g remains free.

It is clear that wheels which are distinguished by an appearance which can be configured very substantially freely can be provided. Owing to the plurality of covering parts which have a supporting function, the wheels have sufficient rigidity despite a low overall weight while simple production capability is provided.

The invention claimed is:

1. A wheel for vehicles, comprising:
   a rim ring having a central ring opening defined there through;
   a main support at least partially disposed in the opening of said rim ring, said main support having a plurality of spokes extending outwardly therefrom;
   a plurality of covering parts each disposed locally in a region of said plurality of spokes and configured such that one of said plurality of covering parts at least partially covers one of said spokes, said covering parts each being integrally bonded to both of said main support and said rim ring such that said main support and said covering parts support said rim ring.

2. The wheel of claim 1, wherein said covering parts are of identical or different design.

3. The wheel of claim 1, wherein at least one of said covering parts is provided for each spoke.

4. The wheel of claim 1, wherein said covering parts form at least partially closed profile cross sections with the main support.

5. The wheel of claim 1, wherein said covering parts are produced from sheet metal as at least one of formed or folded parts.

6. The wheel of claim 1, wherein said covering parts are produced by a bend forming process.

7. The wheel of claim 1, wherein at least one of said main support and said rim ring are produced from sheet metal.

8. The wheel of claim 1, wherein a wall thickness of said main support is ≤5 mm.

9. The wheel of claim 1, wherein at least one of said plurality of covering parts, said rim ring, and said main support are produced from one or more of a tailored blank and a tailored strip.

10. The wheel of claim 1, wherein a radial outer region of said main support has said plurality of spokes extending therefrom.

11. The wheel of claim 1, wherein said radial outer region of said main support includes an encircling ring.

12. The wheel of claim 1, wherein said rim ring comprises a shoulder integrally connected to a drop base, and wherein said main support and said rim ring are coupled to each other in at least one of a region of said drop base or a region of said shoulder of said rim ring.

* * * * *